May 5, 1953     J. E. CINTRON     2,637,303
HYDRAULIC ACTUATED VALVE
Filed March 29, 1947
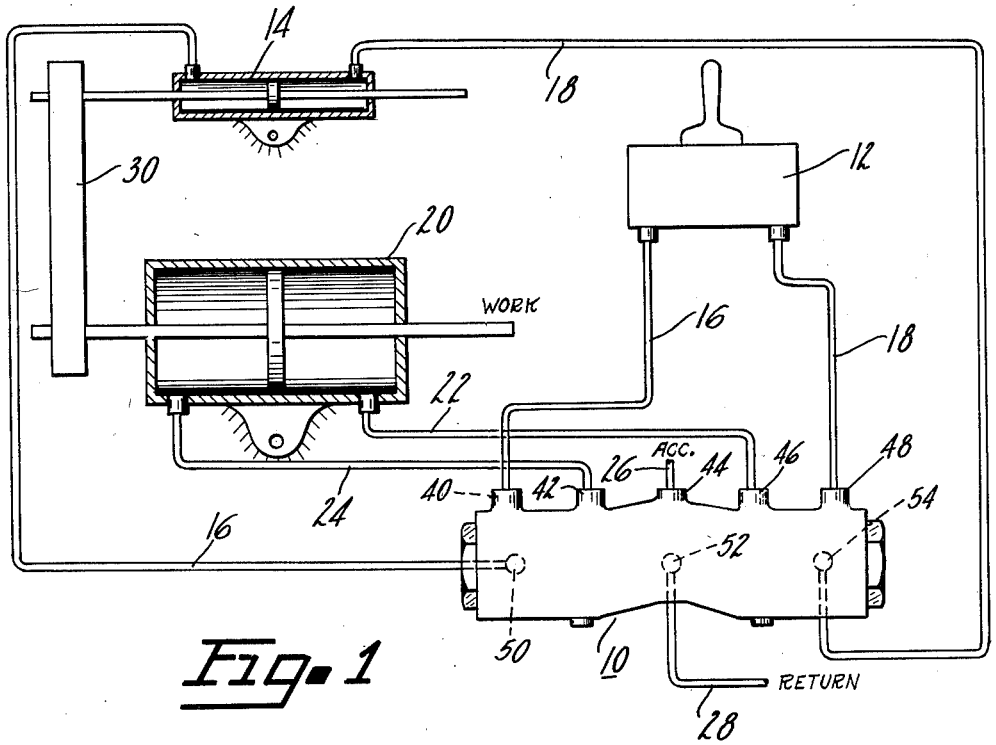
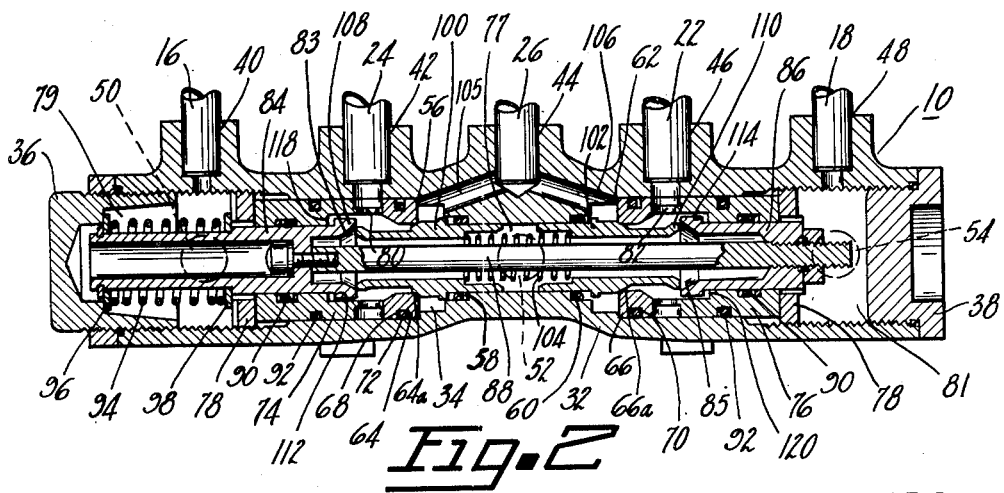
INVENTOR
JUAN E. CINTRON
BY-
Cecil F. Arena
ATTORNEY Patented May 5, 1953

2,637,303

UNITED STATES PATENT OFFICE 2,637,303

HYDRAULIC ACTUATED VALVE

Juan E. Cintron, South Bend, Ind., assignor to Bendix Aviation Corporation, South Bend, Ind., a corporation of Delaware Application March 29, 1947, Serial No. 738,025

6 Claims. (Cl. 121—46.5)

This invention relates to valves and more particularly to valves which are controlled by hydraulic pressure differentials.

An important object of the invention resides in the provision of a valve which is to be actuated by hydraulic pressure remotely controlled.

A more important object of the invention lies in the provision of a hydraulic valve adapted to receive its operating pressure from one hydraulic system for controlling flow in another hydraulic system.

The above and other objects and features of the invention will be apparent from the following description of the device taken in connection with the accompanying drawing which forms a part of this specification, and in which:

Figure 1 is a diagrammatic representation of a hydraulic system incorporating the device of the invention; and Figure 2 is a longitudinal section of the device of the invention.

Referring now to Figure 1, the numeral 10 designates the device of the invention, which is in the form of a hydraulic actuated valve located in a closed hydraulic system and having connections to an open hydraulic system for controlling flow therein. The closed system includes a transmitter device 12, a receiver device or motor 14, and conduits 16 and 18. The transmitter and receiver devices are interconnected by the conduits 16 and 18 through the valve 10. The open hydraulic system, which is a conventional installation, is connected to a motor 20 through the valve 10 by conduits 22, 24, 26 and 28. Conduit 26 is connected to an accumulator, not shown, and conduit 28 is connected to a reservoir, not shown. The piston rods of the two motors 14 and 20 are tied together by a member 30 to provide a follow-up control.

With reference to Figure 2 of the drawing, the valve 10 includes a housing or body 32 having a bore 34 therein extending longitudinally the length of the body. The ends of the bore are closed by plugs 36 and 38 which threadedly engage the body 32. A plurality of bosses are formed integral with the body to provide openings or ports 40, 42, 44, 46, 48, 50, 52 and 54. Ports 40, 50 and 48, 54 are connected to conduits 16 and 18 respectively which conduits interconnect the transmitter and receiver devices 12 and 14, see Figure 1. The bore is formed interiorly with shoulders 56, 58, 60 and 62. Members 64 and 66 are disposed axially within the bore contiguous the shoulders 56 and 62 respectively to provide valve seats 64a and 66a between the inlet port 44 and the cylinder ports 42 and 46. The members 64 and 66 contain grooves 68 and 70 for the reception of sealing rings 72. A pair of axially extending sleeves 74 and 76 are disposed in each end of the bore so that one end of each sleeve engages the members 64 and 66 respectively to hold the same in position against the shoulders 58 and 62. The other ends of the sleeves are in contact with nuts 78 threaded into the ends of the bore 34. The ends of the sleeves contiguous the members 64 and 66 are recessed circumferentially and bored radially at 80 and 82 to provide communication with the interior of the bore and the cylinder ports 42 and 46.

Plungers 84 and 86 are slidably positioned and coaxially arranged in the sleeves 74 and 76 respectively and divide the bore into a central chamber 77 and two end chambers 79 and 81. The plungers are formed with their adjacent ends having valve seats 83 and 85 positioned in facing relationship with respect to each other. The plungers are rigidly tied together by a rod 88 extending through the intermediate or central part of the bore. The other ends of the plungers 84 and 86 terminate in opposite ends of the bore where said other ends are subjected to pressures in conduits 16 and 18 of the closed system.

Seals 90 and 92 carried by the sleeves 74 and 76 prevent the leakage of fluid under pressure between the ends of the bore and the cylinder ports 42 and 46. Plungers 84 and 86 are normally held in neutral position by a centering spring 94 encircling plunger 84 and having its free ends abutting washers 96 and 98, the former being urged against plug 36 and the latter being urged against nut 78. This arrangement provides for movement of the plungers to the right or left depending on the differential pressure acting on the ends of the plungers. It will be noted that the ends of the plungers on which the pressure in the ends of the bore acts are of the same cross-sectional area.

A pair of hollow valve members 100 and 102 are positioned in the bore intermediate the ends of the plungers on which the valve seats are formed for controlling flow between the inlet and the cylinder ports on the one hand and the cylinder and return ports on the other hand. The valve members 100 and 102 are coaxially arranged end to end in the bore with a spring 104 interposed between the adjacent ends thereof urging the valves in opposite directions against valve seats 64a and 66a to thereby cut off flow between the inlet port 44 and the cylinder ports 42 and 46. Flow to the cylinder ports is through passages 105 and 106. The remote ends of the valve members are formed at 108 and 110 with enlarged heads to engage the valve seats 83 and 85 respectively when plunger 84 is moved to the right and plunger 86 is moved to the left. To limit the axial movement that can be imparted to the valves by the plungers, the plungers are formed exteriorly with stops 112 and 114 for engagement with the shoulders 118 and 120 of the sleeves. Seals 116 wipe the exterior surfaces of valves 100 and 102 and prevent leakage of fluid between the inlet port 44 and the return port 52.

Operation of the valve is as follows:

With the parts of the hydraulically actuated valve in the positions shown in Figure 2 the valve members 100 and 102 are normally seated on valve seats 64a and 66a to thereby cut off communication between inlet port 44 and the cylinder ports 42 and 46. Plungers 84 and 86 are normally held in neutral position, as shown, by spring 94. At this time the enlarged heads 108 and 110 are unseated from the valve seats 83 and 85 formed in the ends of the plungers in facing relationship. With the valve heads 108 and 110 out of engagement with the valve seats 83 and 85 respectively, communication is established between the cylinder ports and the return port 52.

To move the piston of motor 20 to the right, it will be necessary to move plunger 84 to the right to cause valve seat 83 to move into engagement with the valve head 108 to close off cylinder port 42 from the return port. Continued movement of the plunger to the right will move the valve member 100 off seat 64a to thereby establish communication between the inlet and cylinder port 42 which is connected through conduit 24 to the left end of the fluid motor 20. Movement of the plunger, to first cut off communication between one of the cylinder ports and return port and then establish communication between said one cylinder port and inlet port is performed by the hydraulically actuated valve 10. The other cylinder port is in communication with the return port at this time through an enlarged opening created by plunger 86 moving away from head 110.

In order to move the piston of motor 20 to the right, the transmitter is moved in a direction to increase the pressure in conduit 16 and decrease the pressure in conduit 18. This creates a pressure differential in the ends of bore 34 which pressure differential acts on the ends of the plungers to cause said plungers to shift to the right to thereby connect the left end of motor 20 to line 26. Movement of the piston of motor 20 to the right carries the piston of the follow-up motor 14 to the right which reduces the pressure in line 16 and increases the pressure in line 18 so that the pressure differential acting on the ends of the plungers is destroyed. The spring 94 will then return the plungers to neutral position. Obviously, to move the motor piston 20 to the left, the transmitter is moved in a direction to increase the pressure in line 18 and decrease the pressure in line 16.

Although this invention has been described in connection with certain specific embodiments, the principles are susceptible of numerous other applications that will readily occur to persons skilled in the art. The invention, therefore, is to be limited only as indicated by the scope of the appended claims.

Having thus described the various features of the invention, what I claim as new and desire to secure by Letters Patent is:

I claim:

1. A valve device having a body with a bore therein, a pair of plungers coaxially arranged and slidably disposed one in each end of the bore and dividing the same into a central chamber and a chamber in each end of the bore, said plungers being constituted to have valve seats on their adjacent ends, a pair of cylinder ports in communication with the central chamber of the bore at axially spaced positions in the bore, an inlet port in communication with the bore, a return port in communication with the central chamber of the bore, a pair of valve seats in the bore axially spaced apart therein, a pair of hollow valve members coaxially arranged and slidably disposed in the central chamber of the bore and constructed and arranged to engage the valve seats in the bore to normally cut off communication between the inlet port and cylinder ports, communication between the cylinder ports and the return port being established through the hollow valve members, said pair of hollow valve members being movable off said valve seats in the bore by said plungers and provided on one end with a valve head to cooperate with the valve seats on said plungers to control communication between the cylinder ports and the return port, and means for positioning said plungers so that the valve seats on the ends thereof are normally out of engagement with said valve heads to thereby communicate the return port with the cylinder ports, said plungers being movable in response to differential pressures in the end chambers of the bore to control flow between the ports.

2. A valve device having a body with a bore therein, a pair of plungers coaxially arranged and slidably disposed one in each end of the bore and dividing the same into a central chamber and a chamber in each end of the bore, said plungers being constituted to have valve seats on their adjacent ends, a pair of cylinder ports in communication with the central chamber of the bore at axially spaced positions in the bore, an inlet port in communication with the bore, a return port in communication with the central chamber of the bore, a pair of valve seats in the bore axially spaced apart therein so that one of the valve seats is interposed between the inlet port and one of the cylinder ports and the other valve seat is interposed between the inlet port and the other cylinder port, a pair of hollow valve members slidably disposed and coaxially arranged end to end in the central chamber of the bore and constituted to engage the valve seats in the bore and movable off said seats by said plungers, a spring interposed between the adjacent ends of the valve members urging them in opposite directions to normally cause the valve members to engage the seats in the bore to cut off communication between the inlet port and the cylinder ports, communication between the cylinder ports and the return port being established through said hollow valve members, a valve head on the remote ends of each of the hollow valve members for engagement with the valve seats on the ends of said plungers to control communication between the cylinder ports and said return port, and means for positioning said plungers so that the valve seats on the ends thereof are normally out of engagement with said valve heads to thereby communicate the return port with the cylinder ports, said plungers being movable in response to differential pressures in the end chambers of the bore to control flow between the ports.

3. A valve device having a body with a bore therein, a pair of plungers coaxially arranged and slidably disposed one in each end of the bore and dividing the same into opposing chambers are in each end of the bore, said plungers being constituted to have valve seats on their adjacent ends, a pair of cylinder ports in the bore, an inlet port in the bore, a return port in the bore, a pair of valve seats in the bore axially spaced apart therein so that one of the valve seats is interposed between the inlet port and one of the cylinder ports and the other valve seat is interposed between the inlet port and the other cylinder port, a pair of hollow valve members slidably disposed and coaxially arranged end to end in the bore and constituted to engage the valve seats in the bore to cut off communication between the inlet port and said return port and cylinder ports, communication between the cylinder ports and the return port being established through the hollow valve members, a spring interposed between the adjacent ends of said hollow valve members urging the same against the valve seats in the bore, said hollow valve members being movable off said valve seats by said plungers, a valve head on the remote ends of the hollow valve members for engagement with the valve seats on the ends of said plungers to control communication between the cylinder ports and said return port, and means for establishing said plungers in a neutral position so that the valve seats on the ends thereof are normally out of engagement with said valve heads to thereby communicate the return port with the cylinder ports, said plungers being movable in response to differential pressures in the end chambers of the bore to control flow between the ports.

4. A valve device having a body with a bore therein, a pair of plungers coaxially arranged and slidably disposed one in each end of the bore and dividing the same into opposing chambers are in each end of the bore, said plungers constituted to have valve seats on their adjacent ends, a pair of cylinder ports in the bore, an inlet port in the bore, a return port in the bore, a pair of valve seats in the bore axially spaced apart therein so that one of the valve seats is interposed between the inlet port and one of the cylinder ports and the other valve seat is interposed between the inlet port and the other cylinder port, a pair of hollow valve members slidably disposed and coaxially arranged end to end in the bore and constituted to engage the valve seats in the bore to cut off communication between the inlet port and said return and cylinder ports, communication between the cylinder ports and the return port being established through the hollow valve members, a spring interposed between the adjacent ends of said hollow valve members urging the same against the valve seats in the bore, said hollow valve members being movable off said seats by said plungers, valve heads on the remote ends of the hollow valve members for engagement with the valve seats in the ends of said plungers to control communication between the cylinder ports and said return port, and means for establishing said plungers in a neutral position so that the valve seats on the ends thereof are normally out of engagement with said valve heads to thereby communicate the return port with the cylinder ports, said means including a pair of washers spaced apart and slidably arranged on one end of one of said plungers, a pair of stops spaced apart in one end of the bore for engagement with said washers, and a spring carried by said one plunger and precompressed between the washers so that said washers are normally in engagement with the stops, said plungers movable in response to differential pressures in the end chambers of the bore to control movement of the valve members.

5. A valve device comprising a body member with a bore therein, a pair of cylinder ports in the bore, an inlet port in the bore, a return port in the bore, a pair of valve seats in the bore, a pair of hollow valve members slidably disposed in the bore and constituted to be spring urged into engagement with the valve seats in the bore to cut off communication between the inlet port and said return and cylinder ports, said hollow valve members being constructed and arranged to establish communication therethrough between the cylinder ports and the return port, a valve head on one end of each of the hollow valve members, and hydraulically actuated means including two valve elements, one for each of the valve heads, said last mentioned means embracing a connection between the elements and a spring located in one end of the bore for retaining said elements in a neutral position out of engagement with the valve heads, said elements being movable together in opposite directions from neutral in response to differential pressure so as to engage one or the other of the valve heads to thereby move the hollow valve member which has been engaged off its seat.

6. A valve device having a body with a bore therein, inlet, return, and two working ports in the bore, a pair of valve seats in the bore, one between the inlet port and each working port, a pair of valve members coaxially arranged in the bore, one for each seat, means in the bore urging the valve members onto their respective seats, thus cutting off communication between the inlet and working ports, a passage in each valve member for communicating the working ports with the return port, said passages being coaxially arranged, and hydraulically actuated means for controlling flow in each of said passages, said last named means including two valve elements, one for closing each passage, said valve elements being interconnected by a non-yielding mechanical connection passing through the passages, and means including a spring located in the bore for positioning said valve elements in a neutral position wherein communication is established between the return and working ports, movement of one valve element in a direction to close its associated passage positively moving the other valve element in a direction to establish greater flow through its associated passage.

JUAN E. CINTRON.

References Cited in the file of this patent

UNITED STATES PATENTS

| Number | Name | Date |
| --- | --- | --- |
| 1,314,153 | Schneider | Aug. 26, 1919 |
| 2,165,001 | Meyer | July 4, 1939 |
| 2,563,419 | Rockwell | Aug. 7, 1951 |

FOREIGN PATENTS

| Number | Country | Date |
| --- | --- | --- |
| 16,061 | Great Britain | of 1902 |
| 278,814 | Germany | Oct. 6, 1914 |
| 702,983 | Germany | Feb. 25, 1941 |